(12) United States Patent
Konno

(10) Patent No.: US 11,298,620 B2
(45) Date of Patent: *Apr. 12, 2022

(54) GAME SYSTEM, GAME PROCESSING METHOD, COMPUTER-READABLE NON-TRANSITORY STORAGE MEDIUM HAVING STORED THEREIN GAME PROGRAM, AND GAME APPARATUS

(71) Applicant: NINTENDO CO., LTD., Kyoto (JP)

(72) Inventor: Hideki Konno, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 7 days.

This patent is subject to a terminal disclaimer.

(21) Appl. No.: 16/913,622

(22) Filed: Jun. 26, 2020

(65) Prior Publication Data

US 2020/0324209 A1 Oct. 15, 2020

Related U.S. Application Data

(63) Continuation of application No. 15/668,860, filed on Aug. 4, 2017, now Pat. No. 10,729,982, which is a
(Continued)

(51) Int. Cl.
*A63F 13/795* (2014.01)
*A63F 13/2145* (2014.01)
(Continued)

(52) U.S. Cl.
CPC ........ *A63F 13/795* (2014.09); *A63F 13/2145* (2014.09); *A63F 13/426* (2014.09);
(Continued)

(58) Field of Classification Search
CPC .. A63F 13/795; A63F 13/2145; A63F 13/426; A63F 13/44; A63F 13/46; A63F 13/52; A63F 13/798; A63F 13/822
See application file for complete search history.

(56) References Cited

U.S. PATENT DOCUMENTS

| | | |
|---|---|---|
| 2014/0073416 A1 | 3/2014 | Toyama |
| 2016/0199739 A1 | 7/2016 | Honda |
| 2018/0056196 A1 | 3/2018 | Konno |

FOREIGN PATENT DOCUMENTS

| | | |
|---|---|---|
| JP | 2014-144367 | 8/2014 |
| JP | 2016-107051 | 6/2016 |

OTHER PUBLICATIONS

[Clash Royale walkthrough] To start "Clash Royale" from now, [online1 Mar. 10. 2016, URL: http://app.famitsu.com/20160307_667679/ (4 pages).
(Continued)

*Primary Examiner* — Yingchuan Zhang
(74) *Attorney, Agent, or Firm* — Nixon & Vanderhye PC

(57) ABSTRACT

A game system includes: a versus game processing section configured to perform a versus game process against another player; an index data storage section configured to store index data that varies in accordance with a win/loss result in a versus game; an index update section configured to update the index data on the basis of a win/loss result of a player; a first parameter change section configured to change a first parameter associated with a first object included in a predetermined development target, when the index data has satisfied a predetermined condition; and a presentation section configured to present an image of the first object in which the changed parameter is reflected, to the player.

24 Claims, 15 Drawing Sheets

Related U.S. Application Data continuation of application No. PCT/JP2016/004003, filed on Sep. 1, 2016.

(51) Int. Cl.

| | |
|---|---|
| *A63F 13/426* | (2014.01) |
| *A63F 13/44* | (2014.01) |
| *A63F 13/46* | (2014.01) |
| *A63F 13/52* | (2014.01) |
| *A63F 13/798* | (2014.01) |
| *A63F 13/822* | (2014.01) |

(52) U.S. Cl.
CPC ............. *A63F 13/44* (2014.09); *A63F 13/46* (2014.09); *A63F 13/52* (2014.09); *A63F 13/798* (2014.09); *A63F 13/822* (2014.09)

(56) References Cited

OTHER PUBLICATIONS

"Clash Royale walkthrough" All types of arenas and number of trophies required!, [online Jul. 5, 2016, URL: http://claclakonet.net/cr-arena-s (9 pages).

Castle & Dragon: Complete analysis of "castle town" which you really should learn to become strong, [online1 Feb. 16, 2015, URL:http://weekly.asciijp/elem/000/000/304/304566/ (5 pages).

[Castle & Dragon walkthrough] "Strength P". "Skill P", and "Lowering P", What is "P"?, [online1 May 26, 2016, URL: http://shirodora.co/%E5%88%9D%E5%BF%83%E8%80%85%E6%94%BB%E7%95%A5/%E3%80%90%E5%9F%8E%E3%83%89%20E3%83%A9%E6%94%BB%E7%95%A5%E3%80%91%E3%81%A4%E3%82%88%EF%BD%90%E3%83%BB%E3%81%86%E3%81%BE%EF%BD%90%E3%83%BB%E3%81%95%E3%81%92%EF%BD%90%E3%80%8C%EF%BD%90%E3%80%8D%E3%81%A3-2470 (3 pages).

[Clash Royale walkthrough] Frequently asked questions and answer collection about "Clash Royale" (FAQ), [online1 Mar. 11, 2016, URL:http://gamy jp/clashroyale/kurarowa-faq (2 pages).

International Search Report for PCT/JP2016/004003, dated Nov. 1, 2016, 5 pages.

Written Opinion of the ISA for PCT/JP2016/004003, dated Nov. 1, 2016, 10 pages.

Office Action dated Jul. 24, 2018 issued in Japanese Application No. 2017-534762 (5 pgs.) and Translation (5 pgs.).

Wii&DS "MySims Racing" .Win the race to develop the town, Response, IID Inc., Mar. 26, 2009 [online], searched on Jul. 6, 2018, URL: https://response.ip/article/2009/03/26/122250.html (2 pgs.).

MySims My town created with Wii!!, Famitsu DS + Wii, Japan, Enterbrain Inc., Jun. 1, 2007, vol. 9, No. 6, p. 71 (4 pgs.).

Nintendo Official Guide SimCity, Japan, Shogakukan Inc., Apr. 20, 1997, 1st edition, 13th copy, p. 55 (3 pgs.).

SimCity—1991—Nintendo.pdf, Nintendo.pdf, published in 1991 (Year: 1991) https://www.gannesdatabase.org/Media/SYSTEM/NintendoNES/Manual/fornnated/SinnCity.

Mario Golf World Tour 04032015.pdf, https://web.archive.org/web/20150403163216/https://www.nnariowiki.conn/Mario Golf: World Tour, published on Apr. 3, 2015 (Year: 2015).

List of Mario Golf World Tour tournaments 03012015.pdf, https://web.archive.org/web/20150301194738/https://www.nnariowiki.conn/List of Mario Golf: World Tour tournaments, published on Mar. 1, 2015 (Year: 2015).

Elo rating system—Wikipedia 05232015.pdf, https://en.wikipedia.org/w/index.php?title=Elo rating systenn&oldid=663658138, published on May 23, 2015, last accessed Jun. 11, 2019 (Year: 2015).

Clash of Clans—Wikipedia 08302015.pdf, https://en.wikipedia.org/w/index.php?title=Clash of Clans&oldid=678556748, published on Aug. 30, 2015, last accessed on Feb. 11, 2019, (Year: 2015).

Clash of Clans—Wikipedia 08282016.pdf, https://en.wikipedia.org/w/index.php?title=Clash of Clans&oldid=736575118, published on Aug. 28, 2016, last accessed on Feb. 11, 2019, (Year: 2016).

How does the match up in clan wars work 08112014.pdf, https://forunn.supercell.conn/showthread.php/354900-How-does-the-match-up-in-clan-wars-work, published on Aug. 11, 2014, last accessed on Feb. 11, 2019, (Year: 2014).

Upgrade troops 04292015.pdf, https://ganning.stackexchange.conn/questions/215768/will-already-existing-troops-upgrade-when-their-respective-laboratory-research-f, published on Apr. 29, 2015, last accessed on Feb. 11, 2019. (Year: 2015).

ScreenShotClashofClansStrategyGuide.pdf, screen shots from Clash of Clans TH 1-7 Beginner Strategy Guide video from YouTube https://www.youtube.conn/watch?v=6Nqr0-gjhOo, published on Jun. 19, 2014, last accessed on Feb. 11, 2019. (Year: 2014).

GAME SYSTEM, GAME PROCESSING METHOD, COMPUTER-READABLE NON-TRANSITORY STORAGE MEDIUM HAVING STORED THEREIN GAME PROGRAM, AND GAME APPARATUS

CROSS REFERENCE TO RELATED APPLICATION

This is a continuation of U.S. application Ser. No. 15/668,860 filed Aug. 4, 2017, which is a continuation of International Application No. PCT/JP2016/004003 filed on Sep. 1, 2016, the content of each of which is incorporated herein by reference in this application.

FIELD

The exemplary embodiments herein relate to a versus game system, etc., and more particularly relate to a game system that uses rates of players in a versus game.

BACKGROUND AND SUMMARY

Hitherto, a game system is known which more appropriately matches players who have play skills close to each other, against each other (see, for example, Japanese Laid-Open Patent Publication No. 2014-144367). In such a game system, a value representing a player's play skill that is strength of play is used as an ability rating. Players having ability rating values close to each other are selected and determined as players who perform match-up play against each other.

In the above game system, the rates are merely used for opponent selection.

Therefore, it is an object of the exemplary embodiments to provide an unprecedented new game system that uses rates as described above.

In order to attain the object described above, the following configuration examples are exemplified.

A configuration example is directed to a game system for performing game processing including a versus game in which a match-up against another player is held and a developing game in which a predetermined development target is developed, the game system including a versus game processing section, an index data storage section, an index update section, a determination section, a first parameter change section, and a presentation section. The versus game processing section is configured to perform a versus game process against another player. The index data storage section is configured to store index data that varies on the basis of a win/loss result of a player in the versus game by the versus game processing section. The index update section is configured to update the index data on the basis of the win/loss result of the player in the versus game by the versus game processing section. The determination section is configured to determine whether the index data has satisfied a predetermined condition. The first parameter change section is configured to change a first parameter associated with a first object included in the predetermined development target when it is determined that the predetermined condition has been satisfied. The presentation section is configured to present an image of the first object in which the changed first parameter is reflected, to the player. For the object, a meaning of an object group including a plurality of object is also included.

According to the above configuration example, it is possible to provide a new-form game in which an index based on a win/loss result in a versus game can be reflected in a game factor other than the versus game.

In another configuration example, the game system may further include a game selection section configured to selectively execute the versus game and the developing game.

According to the above configuration example, it is possible to synergistically enhance motivations of the player for both the versus game and the developing game.

In another configuration example, the index data may be a rate (sometimes referred to as rating) indicating ability of the player at the game by a predetermined value.

According to the above configuration example, the skill or ability of the player at the game can be reflected, for example, in a game factor in which a predetermined object is developed. In addition, the effort or the like of the player at the versus game can be visually presented to the player. Accordingly, the motivation of the player for the game can be synergistically enhanced.

In another configuration example, the index update section may cause a value of the index data to rise or fall on the basis of a win for the player as a result of the versus game, and may cause the value of the index data to rise or fall on the basis of a loss for the player as a result of the versus game. Furthermore, the value of the index data may be a value that increases or decreases on the basis of the win/loss result of the player in the versus game, and the index update section may increase the value of the index data when the player wins as a result of the versus game, and may decrease the value of the index data when the player loses as a result of the versus game.

According to the above configuration example, the index can be presented to the player in an easy-to-understand form.

In another configuration example, the game system may further include a selection section configured to select another player having a value close to the index data of the player, as an opponent in the versus game process.

In addition, the selection section may select a plurality of the opponents as opponent candidates, and the game system may further include: a candidate display section configured to display the plurality of opponent candidates such that any of the plurality of opponent candidates is selectable; and an opponent selection section configured to select any of the plurality of opponent candidates on the basis of an operation of the player.

According to the above configuration example, players having close ability at the game can be caused to play the versus game against each other, and the entertaining features of the game can be enhanced.

In another configuration example, when the value of the index data exceeds a predetermined threshold, the determination section may determine that the predetermined condition has been satisfied.

According to the above configuration example, for example, it is possible to show a value of the index at which the parameter regarding the predetermined object can be changed, to the player in an easy-to-understand form.

In another configuration example, when it is determined that the index data has satisfied the predetermined condition, the first parameter change section may change the first parameter without needing an operation of the player. In addition, the presentation section may change an appearance of the first object on the basis of change of the first parameter, and may present the first object.

According to the above configuration example, since the appearance of the predetermined object automatically changes, a sense of surprise can be given to the player, and the motivation for game play can be enhanced.

In another configuration example, the game system may further include a second parameter change section configured to change a second parameter on the basis of an operation of the player, the second parameter being associated with a second object included in the predetermined development target and being different from the first parameter. In addition, the presentation section further presents an image of the second object based on the second parameter changed by the second parameter change section, to the player. Furthermore, when it is determined that the index data has satisfied the predetermined condition, change of the second parameter based on an operation of the player by the second parameter change section may become possible.

According to the above configuration example, as a game factor in which the index is reflected, for example, it is possible to present the second object in addition to the first object. Thus, regarding the game factor in which the index is reflected, the entertaining features can be further enhanced.

In another configuration example, a value of the first parameter may not return to a value that is a value before the change by the first parameter change section, even when the predetermined condition becomes unsatisfied due to variation of the index data after the index data has satisfied the predetermined condition.

According to the above configuration example, the motivation of the player for the game is not decreased, and it is possible to maintain the motivation of the player for the game.

In another configuration example, the versus game processing section may perform determination of the win/loss by comparing scores of the player and an opponent in the versus game, and the index update section may determine a variation amount of the index data on the basis of the score of the player. Alternatively, the index update section may determine a variation amount of the index data on the basis of the score of the opponent.

According to the above configuration example, for example, the index can be decreased by a value based on the score of the player when the player lose the versus game, and can be increased by a value based on the score of the opponent when the player wins the versus game. Accordingly, the variation of the index can be presented to the player in an easy-to-understand form.

In another configuration example, the game system may further include a match-up parameter change section configured to change a versus game parameter to be used in the versus game process, on the basis of the first parameter changed by the first parameter change section.

According to the above configuration example, two motivations, that is, a motivation for the versus game and a motivation to change (e.g., grow) the predetermined object in which the first parameter is reflected, can be synergistically enhanced, and the entertaining features of the game can be further enhanced.

In another configuration example, the predetermined development target may be a town including a plurality of objects, and the first object may be the object that can be arranged in the town.

According to the above configuration example, for example, the entertaining features of a developing game in which a "town" including many objects such as buildings is caused to grow, can be further enhanced.

According to the present embodiment, an unprecedented new game in which an index based on a win/loss result in a versus game can be reflected in a game factor other than the versus game.

DETAILED DESCRIPTION OF NON-LIMITING EXAMPLE EMBODIMENTS

Hereinafter, an exemplary embodiment will be described.

Figure 1:
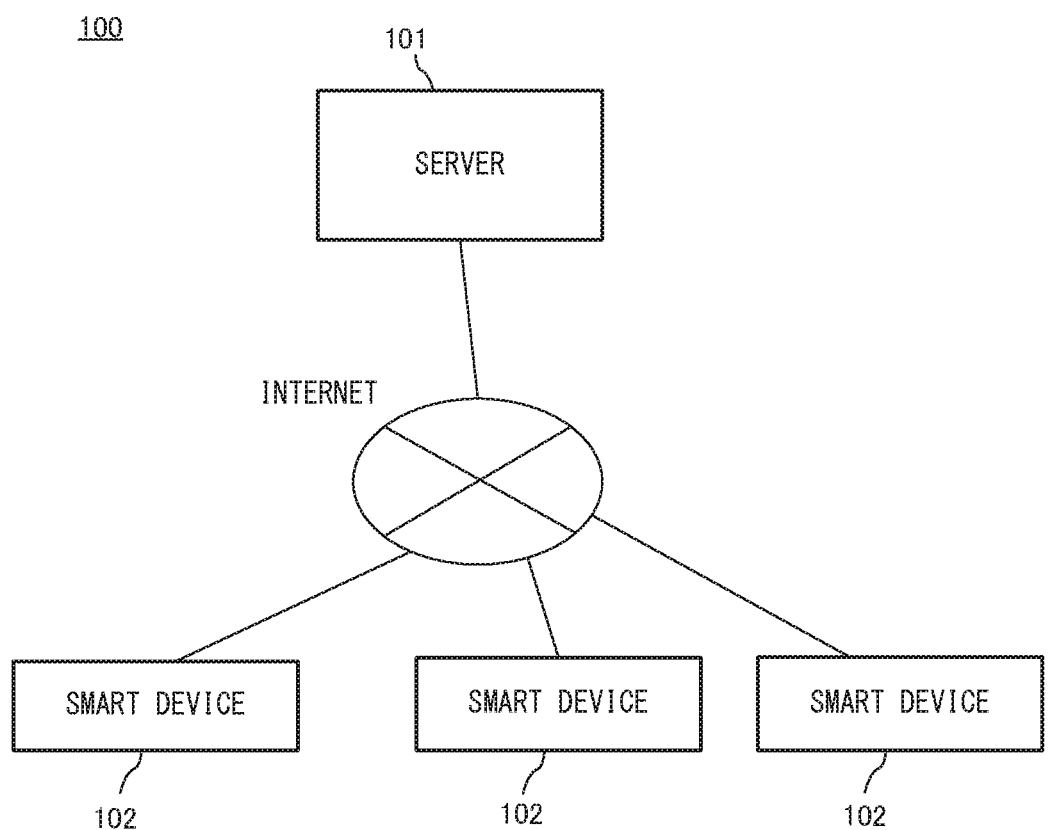
FIG. 1 is a schematic diagram showing the overview of a game system that is an example of an embodiment.

FIG. 1 is a schematic diagram showing the overview of a game system according to the present embodiment. The game system 100 of the present embodiment includes a server 101 and a plurality of portable smart devices 102 (hereinafter, referred to merely as smart devices) each of which is an example of an information processing apparatus. Each smart device 102 is, for example, a smartphone, a tablet, or the like. The server 101 and each smart device 102 are configured to be able to communicate with each other via the internet.

Figure 2:
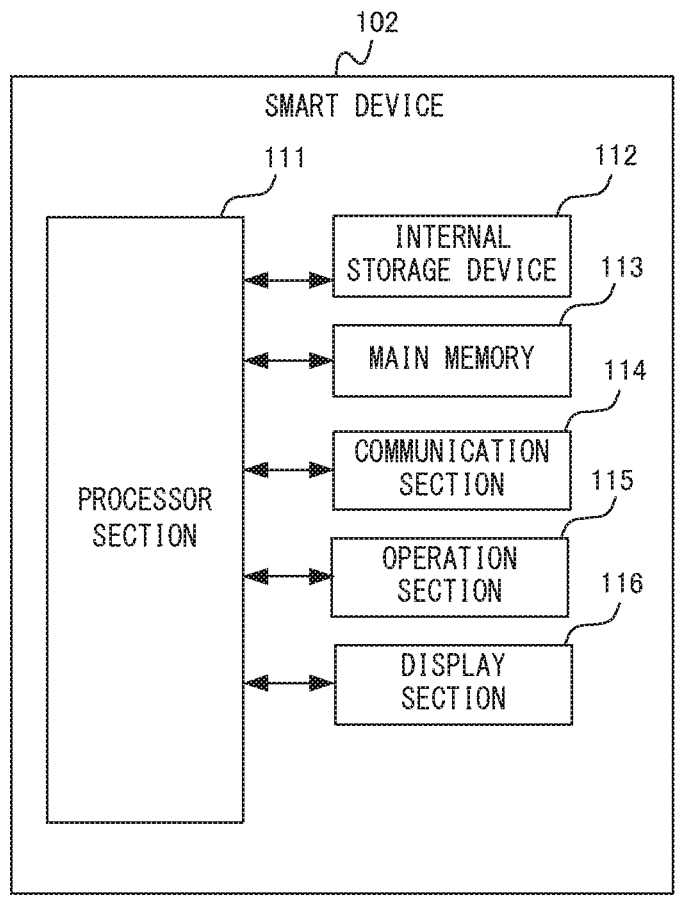
FIG. 2 is a functional block diagram of a smart device 102.

Next, the configuration of each hardware in the above system will be described. FIG. 2 is a functional block diagram of the smart device 102. In FIG. 2, the smart device 102 includes a processor section 111, an internal storage device 112, a main memory 113, a communication section 114, an operation section 115, and a display section 116. The processor section 111 executes later-described information processing and executes a system program (not shown) for controlling overall operation of the smart device 102, thereby controlling operation of the smart device 102. The processor section 111 may include a single processor or a plurality of processors. The internal storage device 112 stores therein various programs to be executed by the processor section 111, and various kinds of data to be used in the programs. The internal storage device 112 is, for example, a flash EEPROM or a hard disk device. The main memory 113 temporarily stores therein computer programs and information. The communication section 114 establishes a connection to a network by wired or wireless communication and transmits/receives predetermined data to/from the server 101. The operation section 115 is, for example, an input device for receiving an operation from a user. The display section 116 is typically a liquid crystal display unit. In processing according to the present embodiment, a touch panel integrated with a liquid crystal screen is assumed as the operation section 115 and the display section 116. In another embodiment, a predetermined pointing device other than a touch panel may be used as the operation section 115.

Figure 3:
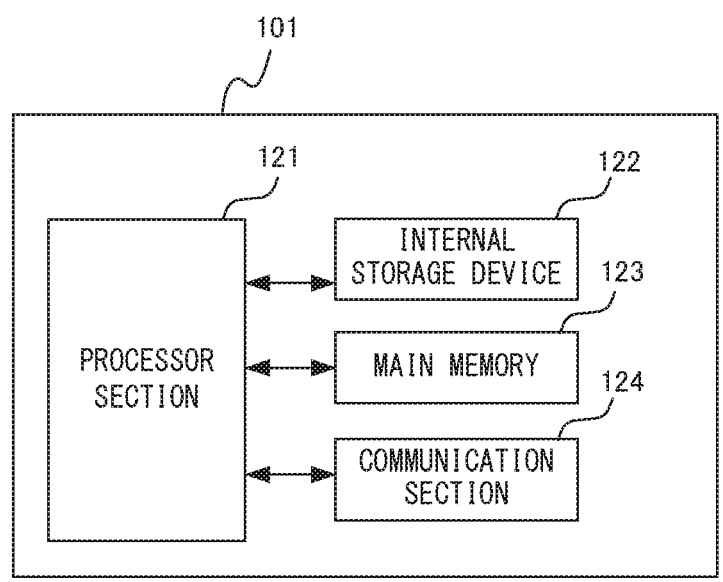
FIG. 3 is a functional block diagram of a server 101.

Next, the configuration of the server 101 will be described. FIG. 3 is a functional block diagram of the server 101. The server 101 includes at least a processor section 121, an internal storage device 122, a main memory 123, and a communication section 124. The processor section 121 executes various programs for controlling the server 101. Various programs to be executed by the processor section 121 and various data to be used by the processor section 121 are stored in the internal storage device 122. The main memory 123 temporarily stores a computer program and information. The communication section 124 establishes a connection to a network by wired or wireless communication and transmits/receives predetermined data to/from the smart devices 102 or another server (not shown).

Next, an operation outline of game processing according to the present embodiment will be described. The game processing according to the present embodiment is game processing having two different game factors of a versus action game and a construction and management simulation (developing) game in which a predetermined development target is developed. In this game, it is possible to selectively execute the versus action game and the developing game. In this game, in the versus action game, a player plays against another player, and a value called "rate" is increased or decreased in accordance with a win/loss result of the play. Then, a development process for the predetermined development target is performed on the basis of this rate. That is, this game is a game in which the rate is reflected in the degree of development of the development target.

Here, the rate in the present embodiment will be additionally described. The rate in the present embodiment is a value representing the skill or ability of the player at the game. That is, the rate is a value that is an index for the skill or ability of the player. For example, the rate is assumed to be indicated at 10 levels of 1 to 10. In addition, an initial rate at the time of new start of the game is assumed to be "5". Then, when a player performs match-up play, if the player wins, the rate is increased by 1, and if the player loses, the rate is decreased by 1. Therefore, if the player consecutively wins, the rate finally becomes "10", and if the player consecutively loses, the rate finally becomes "1". That is, if the player has a rate of "10", the rate is an index indicating that the player has a high skill at the game, and if the player has a rate of "1", the rate is an index indicating that the player has a low skill at the game. As described above, the rate in the present embodiment is a value that increases or decreases in accordance with a win/loss result in the versus game, and is a value having a meaning as an index for the skill of the player at the game. In the present embodiment, the rate is indicated as the number of later-described resident characters (the population of a town).

Figure 4:
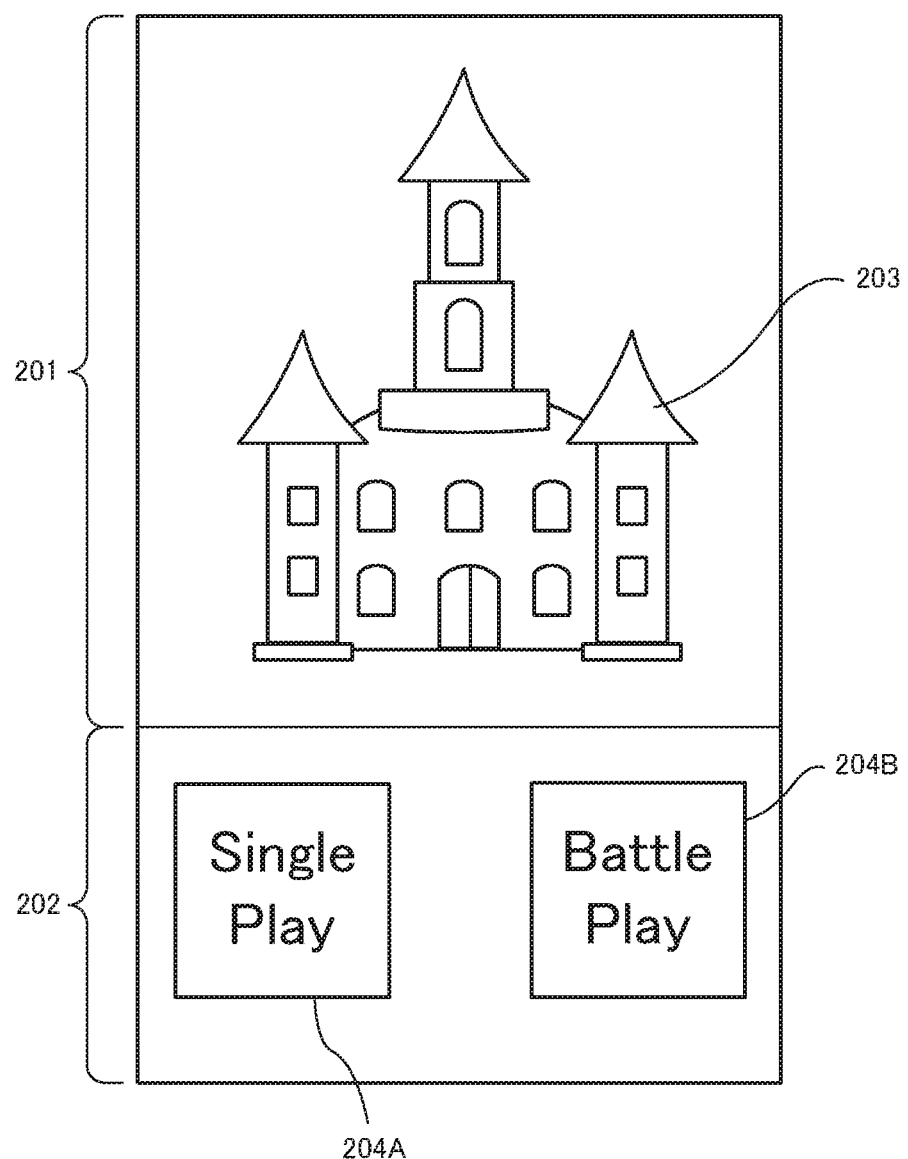
FIG. 4 shows a non-limiting example of a game screen in game processing of the embodiment.

Next, general flow of this game will be further described with reference to the drawings. FIG. 4 shows an example of a game screen in the game processing according to the present embodiment. This screen corresponds to a so-called "home screen" in this game. In FIG. 4, the screen includes two display areas, that is, a town area 201 and a menu area 202. In the town area 201, a castle object 203 is displayed. In the present embodiment, the term "town" has a meaning as to seem like a player's "kingdom". In the present embodiment, the "town" is set as a development target. More specifically, the castle object 203 is set as the development target (an idea of growth of castle object=growth of town is adopted). In the menu area 202, two button images 204A and 204B are displayed. The button image 204A is a button image for solely playing the above-described action game. The button image 204B is a button image for playing the action game with another player in a match-up form. That is, it is possible to selectively execute the versus action game from the home screen. In the present embodiment, the case of playing the action game in a match-up form will be described. In the present embodiment, match-up play is performed in one-on-one form using a horizontal scroll-type jumping action game. In the horizontal scroll-type jumping action game, a player who acquires more coins, which are arranged within a stage, within a time limit wins. The present embodiment shows an example of the horizontal scroll-type jumping action game, but any game may be used as long as the game is a versus game. In another embodiment, for example, a racing game or a versus fighting game may be used, or a game other than an action game, for example, a table game such as a card game, or a quiz game, may be used.

Figure 5:
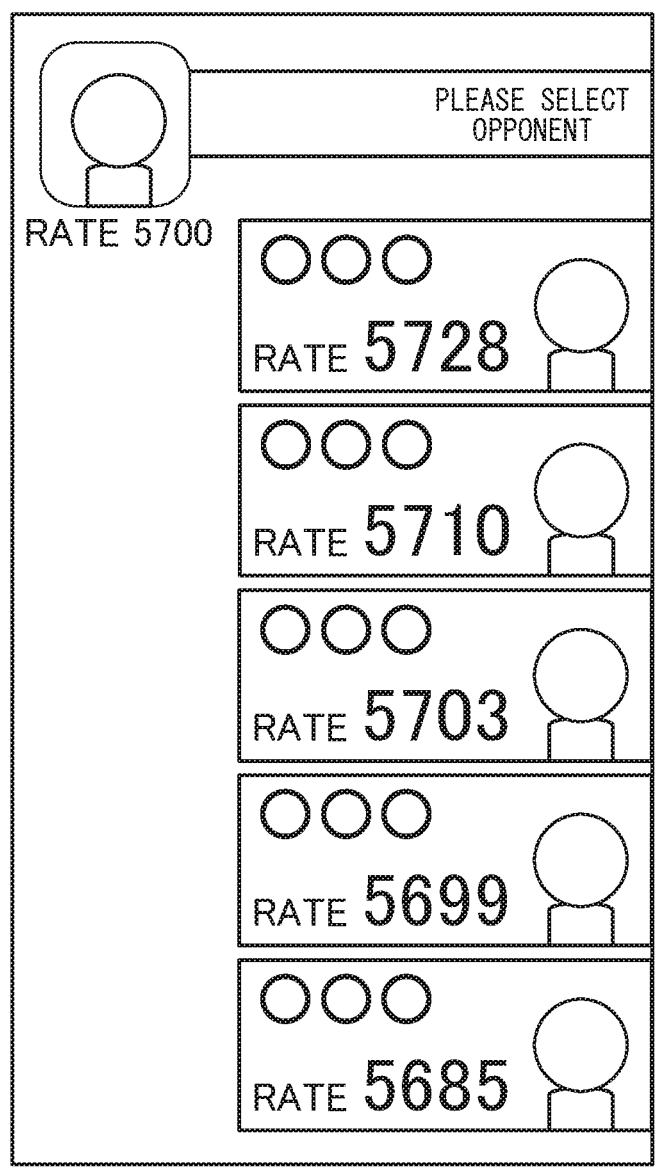
FIG. 5 shows a non-limiting example of an opponent selection screen.

Hereinafter, the above-described action game will be described with reference to the drawings. When the player taps the button image 204B in FIG. 4, an instruction indicating a request for match-up play is transmitted to the server 101. Accordingly, in the server 101, an opponent selection process (matching process) is performed. Then, the result of the selection process is transmitted from the server 101, and an opponent selection screen is displayed as shown in FIG. 5 on the basis of the result. Here, the selection is made by using the rate as described above. Specifically, a process of randomly selecting other players having rates close to that of the player is performed in the server 101. That is, the selection is made such that players having skills close to each other to some extent will be matched against each other.

In the opponent selection screen in FIG. 5, information of the player is displayed at the upper left side of the screen, and a list of opponent candidate information of five players is shown at the right side of the screen. As the information of each candidate, the name of the player, an image related to the player (e.g., a portrait image), and a rate are shown. By taping any opponent among the opponent candidates, the player can start match-up play against the opponent.

In another embodiment, selection of a plurality of opponent candidates as described above may not be made, and only one opponent candidate may be selected. In this case, the opponent selection screen may not be displayed, and when the opponent is selected, information of the opponent may be displayed and match-up play may be started.

Here, the match-up in the present embodiment is not a match-up in a real time form, and is an asynchronous-type match-up. Specifically, the match-up in the present embodiment is in form of playing against so-called "ghost data". When any candidate is tapped in the opponent selection screen, ghost data of the candidate player is downloaded from the server 101. The ghost data includes information indicating the configuration of a played stage, information indicating the contents of the play (operations performed by the opponent), information indicating the number of coins acquired by the player, and information indicating the number of later-described resident characters. Then, in the smart device 102, a game stage (virtual game space) is generated on the basis of the ghost data, and the player plays the stage. That is, the player competes asynchronously in the number of coins acquired within the same time limit in the downloaded stage which is the same as that of the opponent. The above ghost data is generated as appropriate on the basis of the contents of play performed when the action game is played solely, and is uploaded to the server 101. In addition, in another embodiment, a real time-form versus game in which ghost data as described above is not used may be used.

Figure 6:
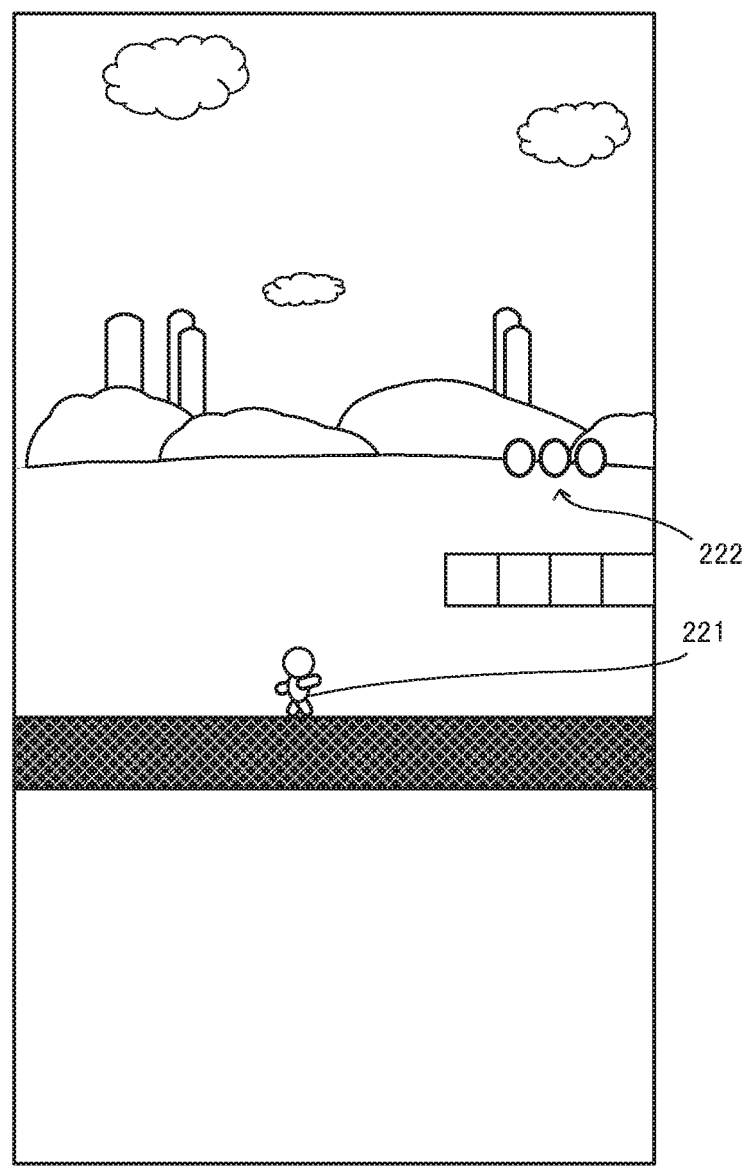
FIG. 6 shows a non-limiting example of a play screen of a versus game.

FIG. 6 shows an example of a play screen of the action game (versus game). As described above, the action game is a horizontal scroll-type jumping action game. In the game screen shown in FIG. 6, a player character 221 and coins 222 are shown. In addition, enemy characters are also present, although the enemy characters are not shown. The player can advance the game stage while collecting coins 222 within a time limit by operating the player character 221.

Meanwhile, in the present embodiment, in the course of advancing the stage, besides the coins, "resident characters" can be acquired by, for example, satisfying a predetermined condition. The resident characters are characters that are residents of the above-described castle object 203. The number of the resident characters is related to development (growth) of the castle object. That is, only one resident character is present at new start of the game, and the player can collect resident characters (increase the number of resident characters) by repeating match-up play. When the number of the resident characters (in other words, the population of the town) increases, the castle object 203 grows (specifically, the appearance thereof changes). Growth of the castle object 203 will be described later.

Figure 7:
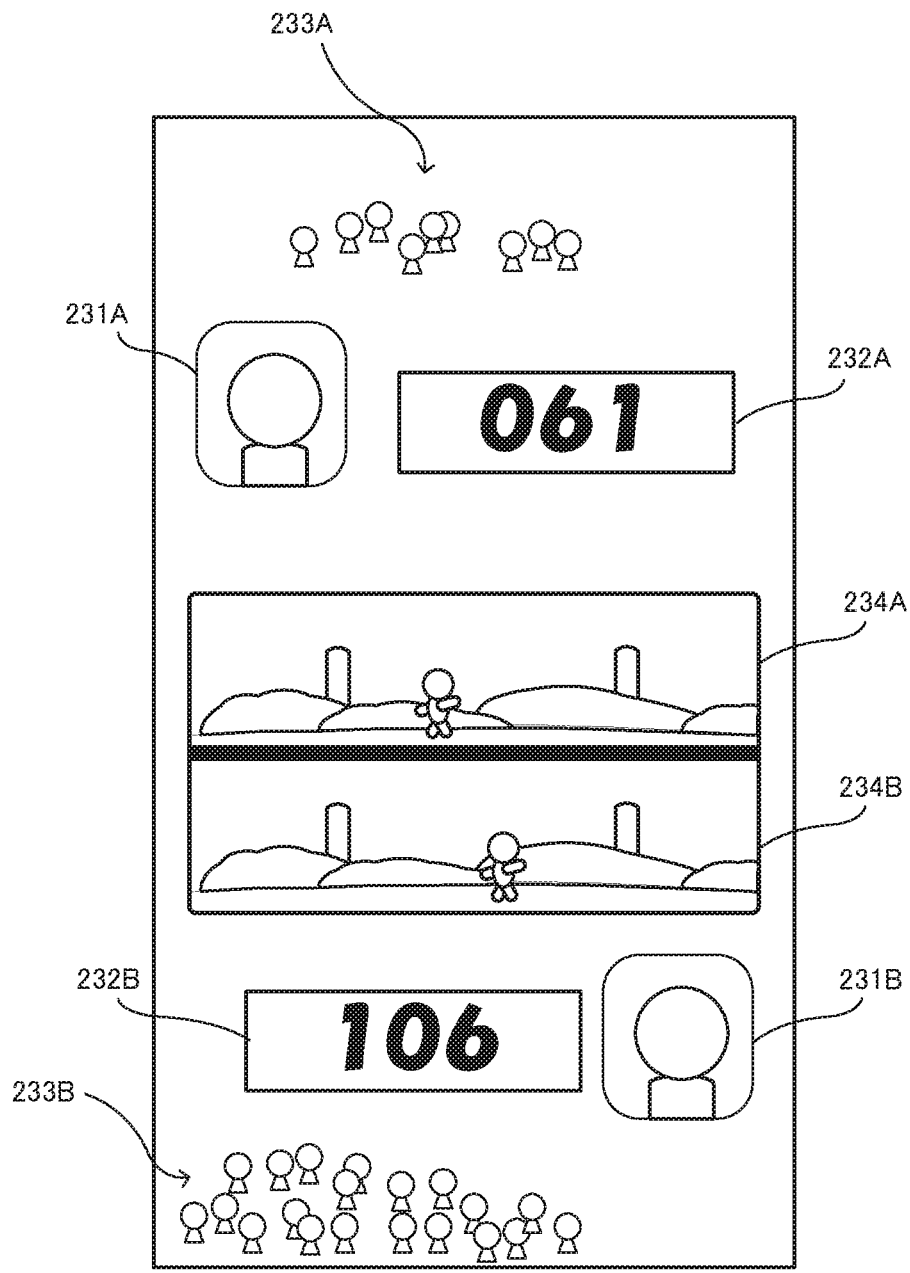
FIG. 7 shows a non-limiting example of a result screen.

Next, determination as to a win/loss in match-up play will be described. When the action game is played and the time limit comes, play in the above stage ends, and a result screen is displayed as shown in FIG. 7. In FIG. 7, information regarding the player is shown in the upper half of the screen, and information regarding the opponent is shown in the lower half of the screen. Specifically, as the information regarding the player, the name of the player, an image 231A regarding the player, resident characters 233A collected by the player, and the number of coins 232A collected by the player are displayed. In addition, a simplified replay area 234A is displayed. In this display area, the contents of the play of the player are replayed and displayed in a simplified manner. Moreover, as specific information regarding the opponent, an image 231B regarding the opponent, resident characters 233B collected by the opponent, and the number of coins 232B collected by the opponent are displayed. Furthermore, a simplified replay area 234B is displayed in which the contents of the play of the opponent are replayed and displayed in a simplified manner. When the result screen is displayed, data indicating the result of the match-up play at this time may be uploaded to the server 101.

In this game, a win or a loss in a match-up is determined on the basis of the number of coins collected. The example of FIG. 7 indicates that the player has collected 61 coins and the opponent has collected 106 coins. Thus, in the example of FIG. 7, a win for the opponent is determined. Then, regarding the resident characters, the following process is performed in accordance with the win/loss result. First, when the player "wins", the player can acquire the resident characters 233B collected by the opponent. That is, the population of the town of the player can be increased. On the other hand, when the player "loses", the current population of the town is decreased by the number of the resident characters 233A collected by the player in the play. That is, when the player wins in the match-up, the player can acquire the resident characters collected by the opponent, and when the player loses in the match-up, the resident character collected by the player in the play are lost. The number of the resident characters, that is, the population of the town, corresponds to the above-described rate. That is, the number of the resident characters is a parameter that increases or decreases in accordance with the win/loss result of the match-up. Furthermore, the number of the resident characters is considered to increase on the basis of the play result of the player (the number of the resident characters collected by the player) when the player loses and to increase on the basis of the play result of the opponent (the number of the resident characters collected by the opponent) when the player wins. That is, the number of the resident characters is also considered as a parameter that increases or decreases on the basis of the play result of either the player or the opponent. In another embodiment, regarding an increase or decrease in the resident characters, a value of the increase or decrease may be determined on the basis of both the player result of the player and the play result of the opponent.

In the present embodiment, the above increase or decrease in the resident characters has an effect on only the player and does not have an effect on the opponent. That is, even when the player wins and acquires the resident characters of the opponent, the number of the resident characters in the data of the opponent is not decreased. On the other hand, even when the player loses and the number of the resident characters of the player decreases, the number by which the number of the resident characters of the player decreases is not added to the number of the resident characters of the opponent. As described above, in the present embodiment, a match-up is held in an asynchronous manner using ghost data, and the same ghost data is supposed to be downloaded by many players. Thus, no effect is exerted on the data of the opponent.

Figure 8:
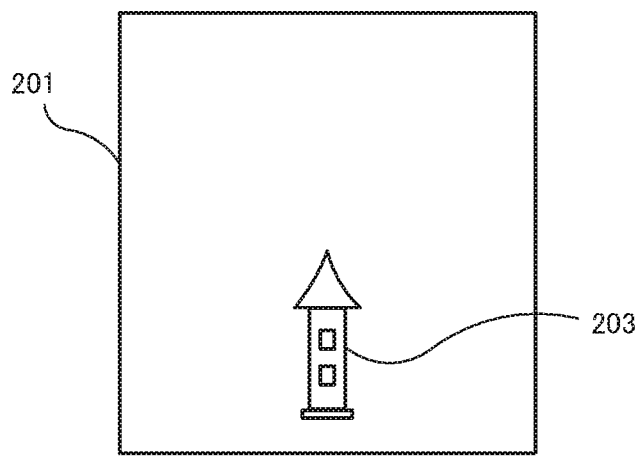
FIG. 8 is a diagram showing a non-limiting example of growth of a castle object 203.
Figure 9:
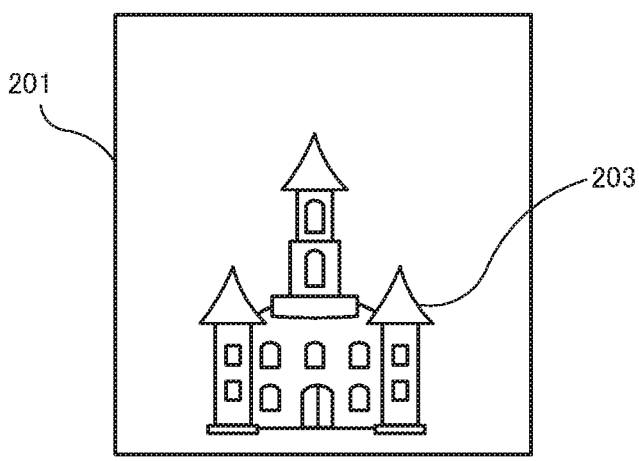
FIG. 9 is a diagram showing the non-limiting example of growth of the castle object 203.
Figure 10:
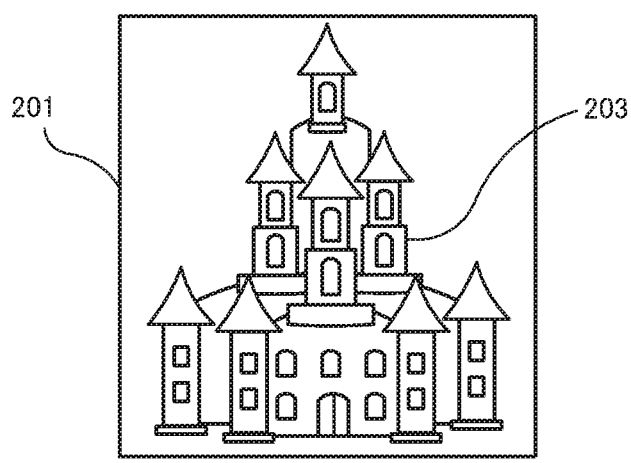
FIG. 10 is a diagram showing the non-limiting example of growth of the castle object 203.

Next, growth of the castle object 203 (town) will be described. As described above, the number of resident characters 233 increases or decreases in accordance of the win/loss result of the match-up play. As the number of the resident characters increases, the castle object 203 grows. FIGS. 8 to 10 show an example of growth of the castle object 203. FIG. 8 shows the castle object 203 immediately after new start of the game. The castle object 203 in this state is in a state where the scale thereof is very small. Hereinafter, the castle object 203 in this state is referred to as "rank 1" castle.

When the number of the resident characters exceeds, for example, 100 as a result of repeating a match-up as described above and collecting resident characters in the "rank 1" state, the appearance of the castle object 203 changes as shown in FIG. 9. In the example of FIG. 9, the scale of the castle object 203 is larger than that in FIG. 8. For example, the appearance automatically changes at the time when the number of the resident characters exceeds 100. In other words, for example, the player does not consume predetermined points to cause the castle object 203 to grow, but the castle object 203 automatically grows when a predetermined condition has been satisfied. Hereinafter, the castle object 203 in the state in FIG. 9 is referred to as "rank 2" castle.

Furthermore, when the number of the resident characters exceeds, for example, 500 as a result of repeating a match-up as described above and collecting resident characters in the "rank 2" state, the appearance of the castle object 203 further changes as shown in FIG. 10. In the example of FIG. 10, the scale of the castle object 203 is larger than that in FIG. 9. Hereinafter, the castle object 203 in the state in FIG. 10 is referred to as "rank 3" castle.

As described above, as the number of the resident characters 233 increases, the castle object 203 grows. As described above, the number of the resident characters has a meaning as the above rate, and there is also an aspect that the number of the resident characters indicates the skill or effort of the player at the game. Thus, the better the player is at the game, the larger the scale of the castle object 203 can be. In other words, it is considered that the skill or ability of the player at the versus action game is visually reflected in the form of the castle object 203 and presented to the player. Thus, the motivation of the player for the game can be enhanced. In addition, the degree of growth of the castle object 203 corresponds to the skill of the player and thus is different for each player. That is, the castle object 203 grows differently for each player. In the above example, three stages of growth of the castle object 203 are shown, but it is needless to say that more stages of growth may be provided.

In the present embodiment, the castle object 203 that has grown does not return to the previous rank state. As described above, the number of the resident characters increases or decreases in accordance with the win/loss result of the match-up. Thus, the number of the resident characters that has reached 100 may decrease to 90 later. Even in such a case, for example, when the castle object 203 grows to the above "rank 2" state since the number of the resident characters exceeds 100, even if the number of the resident characters 233 decreases to 90 later, the castle object 203 does not return to the above "rank 1" state, and the "rank 2" state is maintained. In other words, the degree of growth of the castle object and the number of the resident characters are not completely linked to each other (changed together). If both are completely linked to each other, when the number of the resident characters 233 decreases (the rate decreases), the rank of the castle object 203 decreases, which decreases the motivation of the player for match-up play. Thus, by maintaining the degree of growth of the castle object 203 even when the number of the resident characters decreases as described above, the motivation of the player is maintained.

Next, the game processing according to the present embodiment will be described in detail with reference to FIGS. 11 to 16.

Figure 11:
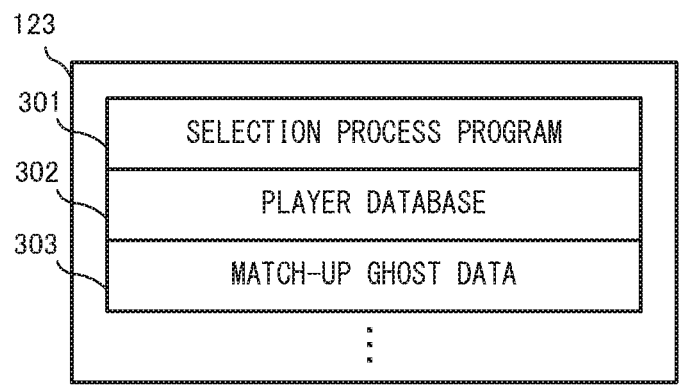
FIG. 11 is a diagram showing a non-limiting example of programs and information stored in a main memory 123 of the server 101.

FIG. 11 shows an example of programs and information stored in the main memory 123 of the server 101. In the main memory 123 of the server 101, a selection process program 301, a player database 302, match-up ghost data 303, etc. are stored.

The selection process program 301 is a program for making opponent selection upon reception of a request from the smart device 102.

The player database 302 is a database in which information regarding players who have played this game is stored. Specifically, ID for identifying each player and data of the number of resident characters (i.e., a rate), a current castle rank, etc. are stored so as to be associated with each player.

The match-up ghost data 303 is ghost data to be used in match-up play as described above, and ghost data regarding a plurality of players is stored therein. The match-up ghost data is generated as appropriate on the basis of the contents of play performed when the above action game is played solely, and is uploaded and stored in the server 101. The match-up ghost data 303 includes, for example, ID of the player for the ghost data, data indicating the configuration of the game stage of the ghost data, and data indicating the number of coins acquired, the number of resident characters acquired, etc.

Figure 12:
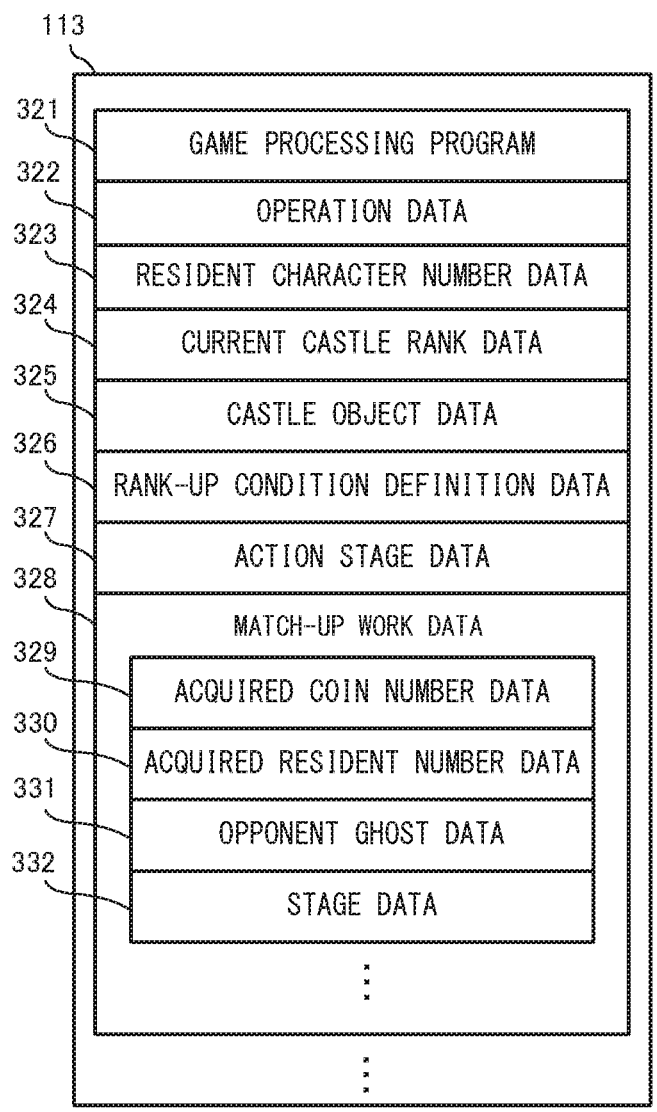
FIG. 12 is a diagram showing a non-limiting example of programs and information stored in a main memory 113 of the smart device 102.

FIG. 12 shows an example of programs and information stored in the main memory 113 of the smart device 102. In the main memory 113, a game processing program 321, operation data 322, resident character number data 323, current castle rank data 324, castle object data 325, rank-up condition definition data 326, action stage data 327, match-up work data 328, etc., are stored.

The game processing program 321 is a program for performing the game processing as described above. Specifically, the game processing program 321 is a program for performing later-described processing of a flowchart in FIG. 13.

The operation data 322 is data indicating various operations performed on the smart device 102. In the present embodiment, the operation data 322 includes button data and touch panel data. These data are data indicating the contents of operations performed on the operation section 115, and are data indicating pressed states of various buttons, a touch coordinate of a touch panel, touch duration, etc.

The resident character number data 323 is data indicating the number of resident characters (the population of the town) as described above. In addition, the data has a meaning as the above-described rate.

The current castle rank data 324 is data indicating the degree of growth of the castle object 203. In the present embodiment, the degree of growth of the castle object 203 is indicated as a concept of the "rank" as described above.

The castle object data 325 is image data and model data to be used for rendering the castle object 203. In the castle object data 325, image data and the like of the castle object 203 corresponding to the "rank" are stored.

The rank-up condition definition data 326 is data that defines a condition for causing the castle object 203 to grow (raising the rank). The rank-up condition definition data 326 is, for example, data that defines a condition of, for example, "causing the castle object 203 to grow to rank 2 when the number of resident objects becomes equal to or larger than 100 in the rank 1 state".

The action stage data 327 is various data for constructing a virtual game space for the action game as described above. That is, the action stage data 327 includes model data for various terrain objects, enemy characters, player characters, etc.

The match-up work data 328 is data that is temporarily generated and used in executing the versus game as described above. The match-up work data 328 includes acquired coin number data 329, acquired resident number data 330, opponent ghost data 331, stage data 332, etc. The acquired coin number data 329 is data indicating the number of coins acquired by the player in the match-up play as described above. The acquired resident number data 330 is similarly data indicating the number of resident characters acquired by the player in the match-up play. The opponent ghost data 331 is data obtained by downloading and storing the match-up ghost data 303 for the opponent from the server 101. The contents of the opponent ghost data 331 are the same as those of the match-up ghost data 303. The stage data 332 is data indicating the configuration of the virtual game space generated on the basis of the opponent ghost data 331. That is, the stage data 332 is data indicating arrangement of terrain objects, enemy characters, coins, and resident characters, etc.

Figure 13:
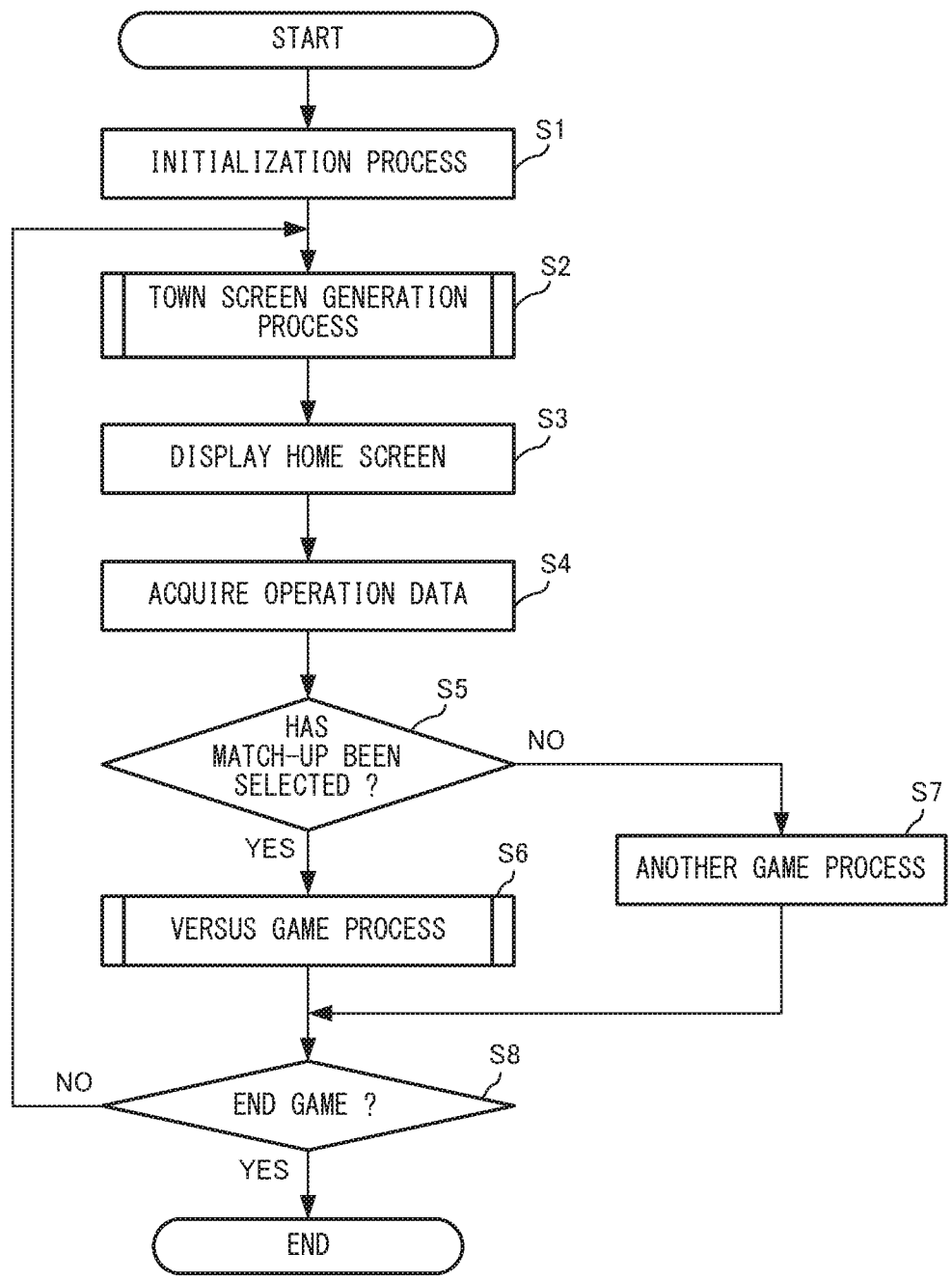
FIG. 13 is a flowchart showing the details of the game processing according to the embodiment.

Next, flow of game processing executed by the processor section 111 of the smart device 102 will be described with reference to the flowchart in FIG. 13. FIG. 13 is a flowchart showing the details of the game processing.

When the game processing is activated on the basis of an activation instruction operation of the player, the processor section 111 initially performs an initialization process in step S1. In this process, initialization of various data, a login process, a process of acquiring, from the server 101, data required for the game processing, etc., are performed. For example, a process of acquiring the current number of resident characters from the player database 302 and storing the current number of resident characters as the resident character number data 323 in the main memory 113, and acquiring, from the player database 302, data indicating the current castle rank and storing the data as the current castle rank data 324 in the main memory 113, etc., are performed.

Figure 14:
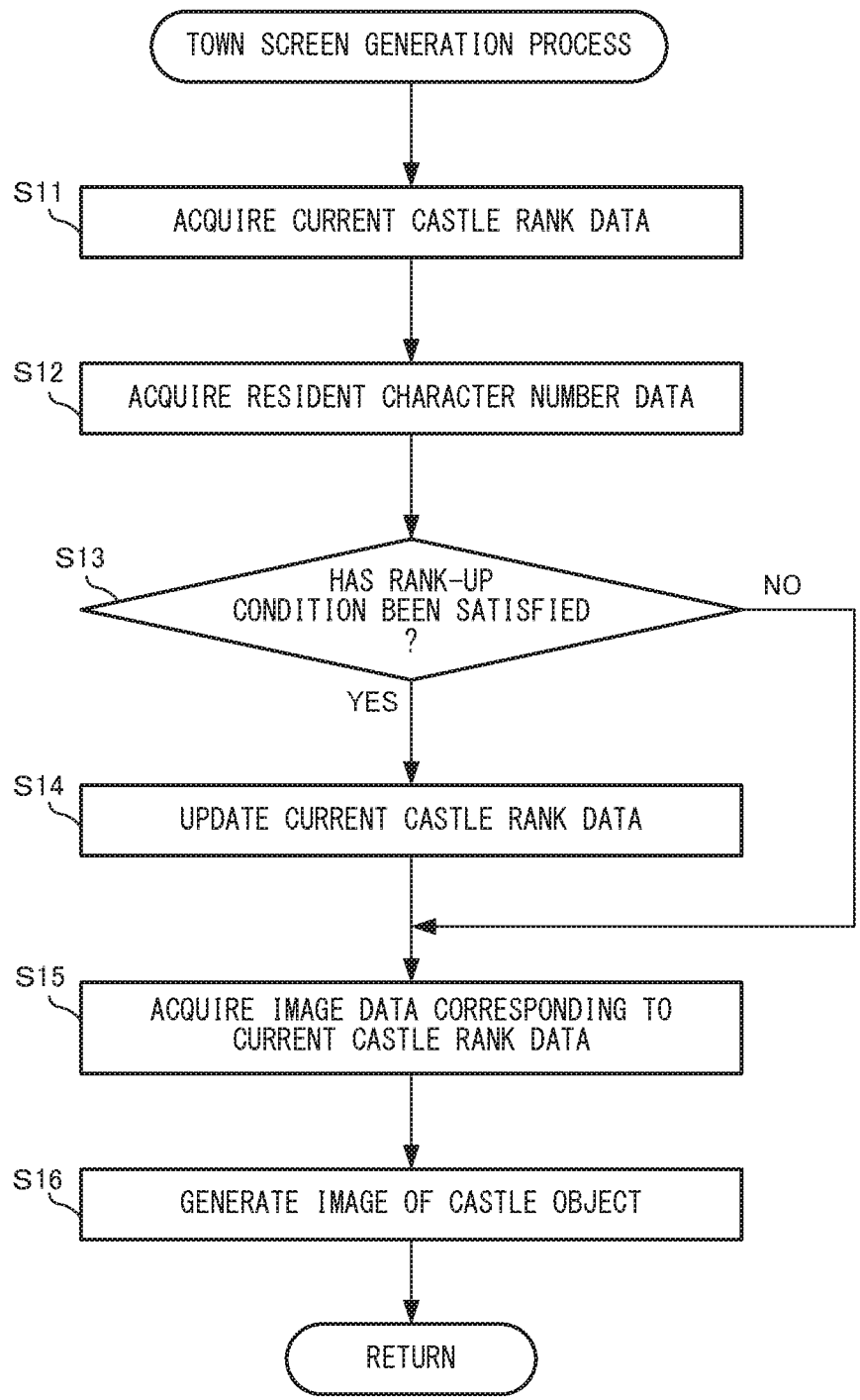
FIG. 14 is a flowchart showing the details of a town screen generation process.

Next, the processor section 111 performs a town screen generation process in step S2. That is, a process for generating an image to be displayed in the town area 201 in FIG. 4 is performed. FIG. 14 is a flowchart showing the details of the town screen generation process. In FIG. 14, first, in step S11, the processor section 111 acquires the current castle rank data 324 from the main memory 113. Next, in step S12, the processor section 111 acquires the resident character number data 323 from the main memory 113. Next, in step S13, the processor section 111 refers to the rank-up condition definition data 326 and determines whether a condition for causing the castle object 203 to grow, that is, a condition for raising the rank, has been satisfied. For example, when the current castle rank is "rank 1" and the number of the resident characters is equal to or larger than 100, it is determined that the condition for raising the rank to "rank 2" has been satisfied. As a result of the determination, when the rank-up condition has been satisfied (YES in step S13), the processor section 111 updates, in step S14, the current castle rank data 324 with a content indicating the rank after raising of the rank (the current castle rank data 324 updated here is transmitted to the server 101 as appropriate and the contents of the player database 302 are also updated as appropriate). On the other hand, when the rank-up condition has not been satisfied (NO in step S13), the process in step S14 is skipped.

Next, in step S15, the processor section 111 acquires the current castle rank data 324 again and acquires, from the castle object data 325, image data and the like of the castle object 203 corresponding to the contents of the current castle rank data 324.

Next, in step S16, the processor section 111 generates an image of the castle object 203 on the basis of the acquired image data and the like. This is the end of the town screen generation process.

Referring back to FIG. 13, next, in step S3, the processor section 111 generates the home screen as shown in FIG. 4 on the basis of the generated image of the castle object 203 and the like, and displays the home screen.

Next, in step S4, the processor section 111 acquires the operation data 322. Subsequently, in step S5, the processor section 111 determines whether start of a match-up battle has been selected, on the basis of the operation data 322. That is, it is determined whether the button image 204B in the screen in FIG. 4 has been tapped. As a result of the determination, when start of a match-up battle has been selected (YES in step S5), the processor section 111 performs a versus game process in step S6.

Figure 15:
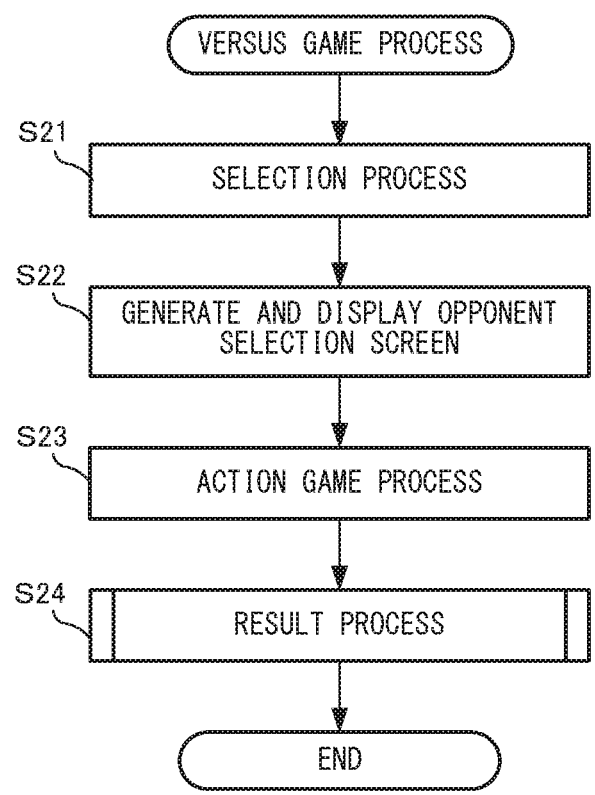
FIG. 15 is a flowchart showing the details of a versus game process.

FIG. 15 is a flowchart showing the details of the versus game process. In FIG. 15, first, in step S21, the processor section 111 performs a selection process for searching for an opponent. Specifically, the processor section 111 transmits a request for the selection process together with information such as the resident character number data 323 (i.e., the rate) of the player to the server 101. Upon reception of the request and the information, the server 101 refers to the player database 302 and randomly extracts five players from among players having a close number of resident characters. Then, the server 101 transmits data indicating the result of the extraction, to the smart device 102. When reception of the data is completed, the selection process ends.

Next, in step S22, the processor section 111 performs a process of generating the opponent selection screen as shown in FIG. 5, on the basis of the result of the extraction received from the server 101, and displaying the opponent selection screen. Then, when the player performs an operation of selecting a certain opponent on the screen, the processor section 111 performs an action game process in step S23. This process will be described more specifically. First, a process of acquiring the match-up ghost data 303 for the selected opponent from the server 101 is performed. Then, a virtual game space (game stage) is generated on the basis of the match-up ghost data 303, and various characters such as a player character are also located. Then, a game screen is displayed, and an action game process based on an operation of the player is performed as appropriate. In this process, the contents of the acquired coin number data 329 and the acquired resident number data 330 are updated as appropriate.

Figure 16:
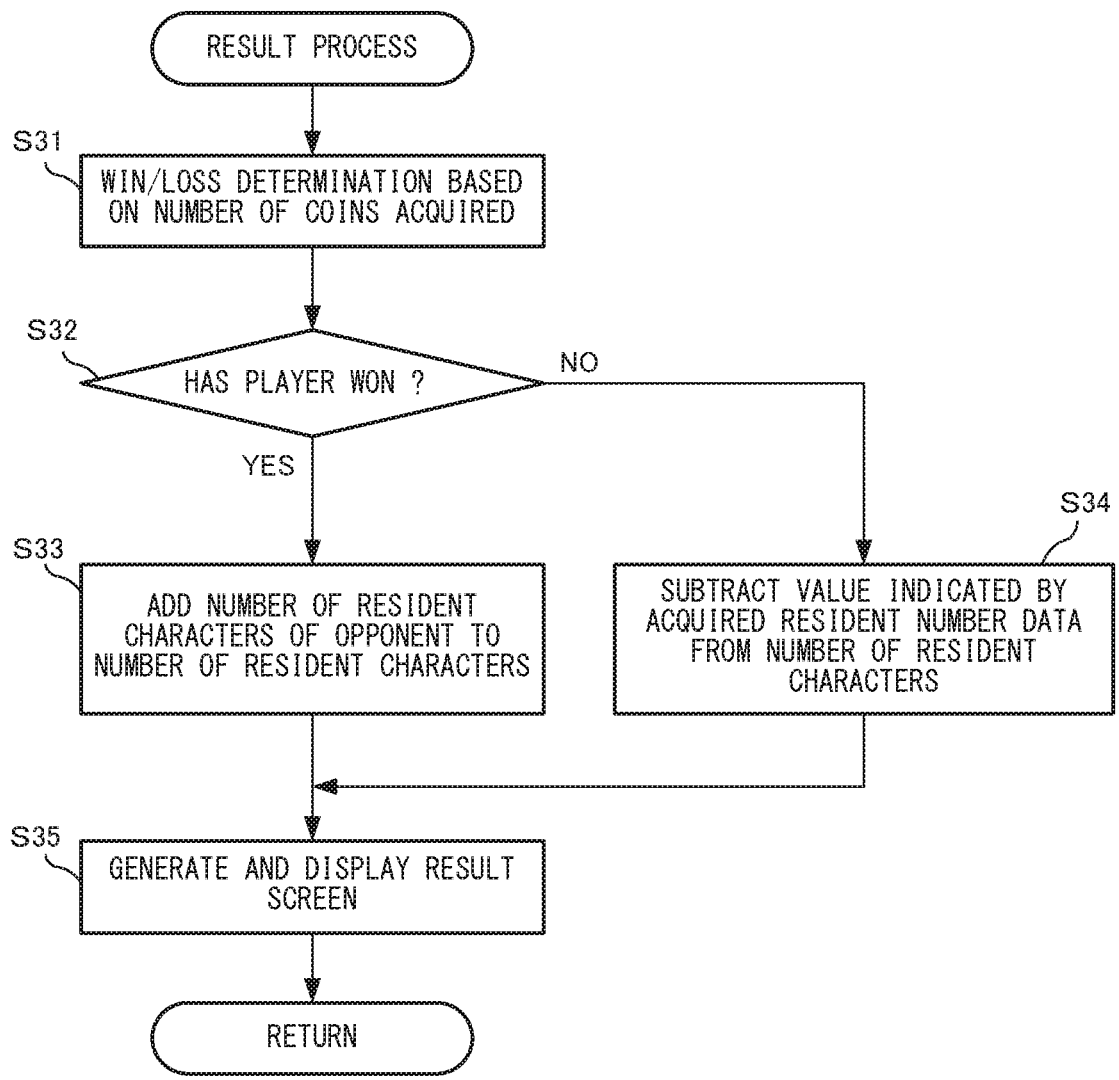
FIG. 16 is a flowchart showing the details of a result process.

Next, when the action game process ends as a result of elapse of a preset time limit, the processor section 111 performs a result process in step S24. FIG. 16 is a flowchart showing the details of the result process. In FIG. 16, first, in step S31, the processor section 111 performs a win/loss determination for a match-up on the basis of the acquired coin number data 329 and data of the number of coins acquired by the opponent which data is included in the opponent ghost data 331.

Next, in step S32, the processor section 111 determines whether the player has won, as a result of the win/loss determination. As a result of the determination, when the player has won (YES in step S32), the processor section 111 adds the number of resident characters acquired by the opponent which number is indicated by the opponent ghost data 331, to the resident character number data 323 in step S33. On the other hand, when the player has lost (NO in step S32), the processor section 111 subtracts the number indicated by the acquired resident number data 330 from the resident character number data 323 in step S34 (the resident character number data 323 updated here is transmitted to the server 101 as appropriate and the contents of the player database 302 are also updated as appropriate).

Next, in step S35, the processor section 111 generates and displays the result screen as shown in FIG. 7. This is the end of the result process.

Referring back to FIG. 15, when the result process ends, the versus game process also ends.

Referring back to FIG. 13, as a result of the determination in step S5, when a match-up has not been selected (NO in step S5), the processor section 111 performs another game process on the basis of the operation data 322 as appropriate in step S7. For example, an action game process for single play or the like is performed.

Next, in step S8, the processor section 111 determines whether a condition for ending this game has been satisfied. When the condition has not been satisfied (NO in step S8), the processor section 111 returns to step S2 and repeats the process. When the condition has been satisfied (YES in step S8), the processor section 111 ends the game processing. This is the end of the description of the game processing according to the present embodiment.

As described above, in the game processing of the present embodiment, the player is allowed to enjoy a match-up in the action game, and at the same time, the rate (the number of the resident characters) is increased or decreased in accordance with the result of the match-up and reflected in growth of the castle object 203. Accordingly, since the index (rate) indicating the skill, ability, or effort of the player at the game is caused to have a meaning as a reference for a growth element, motivations for play for both the versus action game and development of the castle object 203 can be synergistically enhanced. In addition, both the index indicating the skill of the player and an element that is a reference for a growth element are based on "resident characters", and thus can be presented to the player in an easy-to-understand form.

Figure 17:
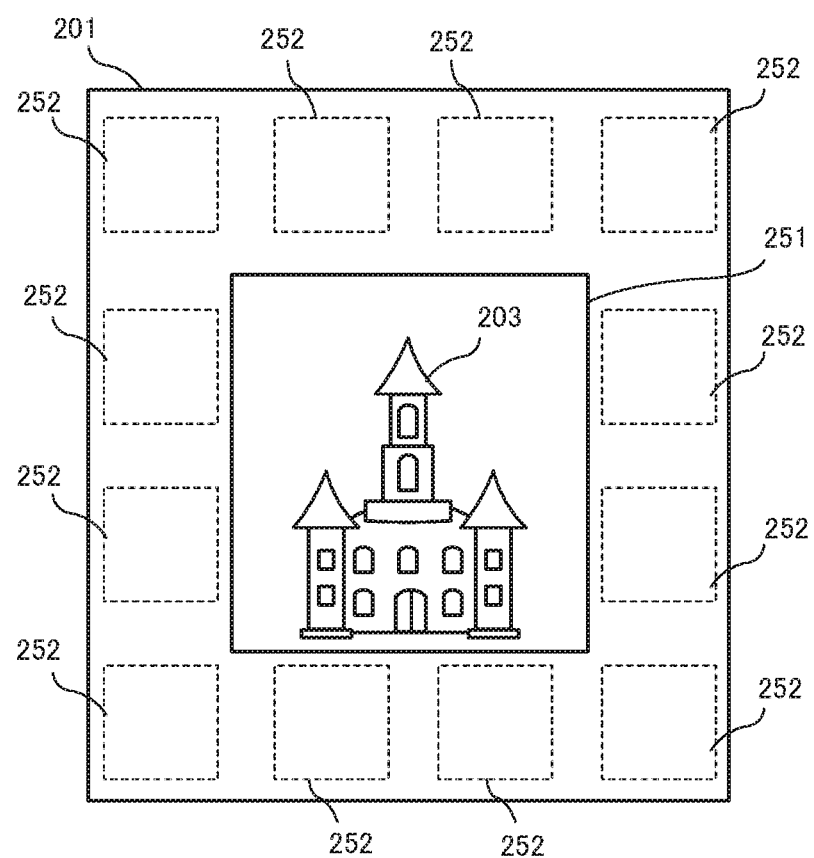
FIG. 17 is a diagram showing another non-limiting example of a town area.
Figure 18:
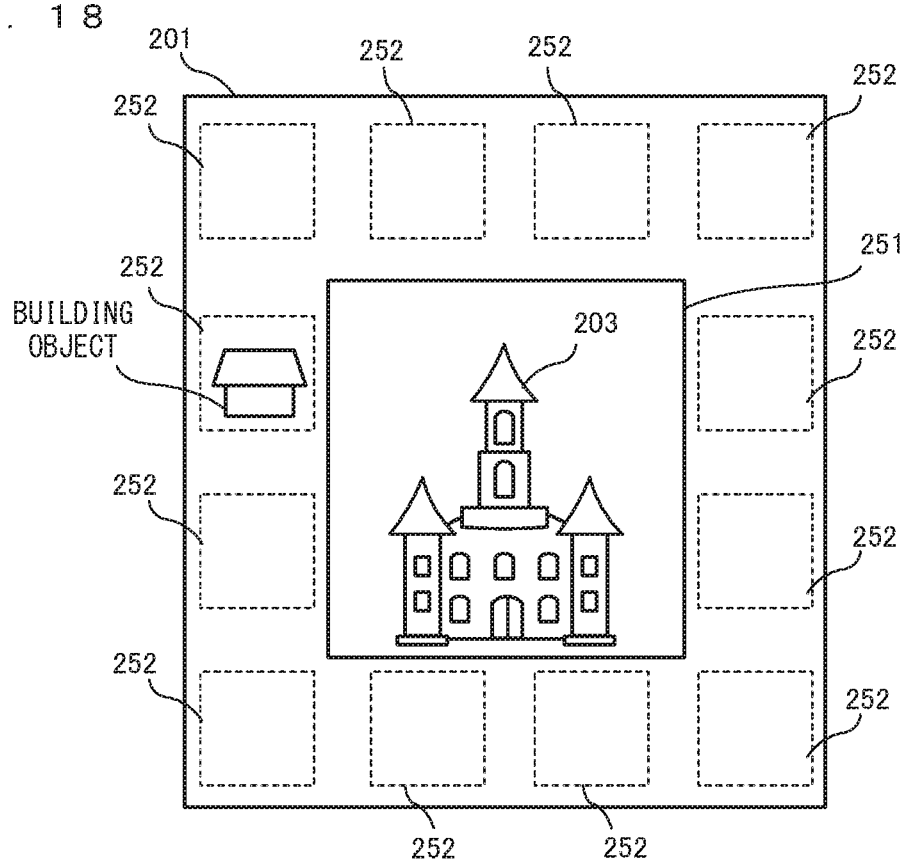
FIG. 18 is a diagram showing still another non-limiting example of the town area.
Figure 19:
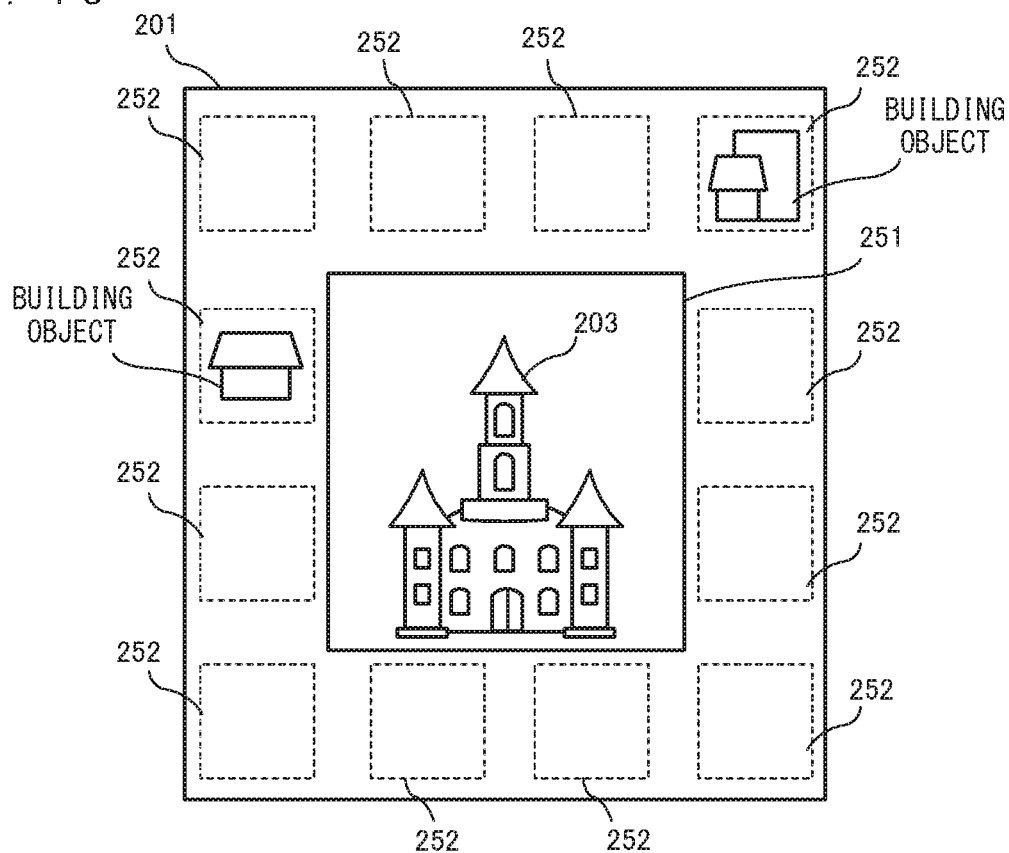
FIG. 19 is a diagram showing still another non-limiting example of the town area.

In the above example, the example in which the castle object 203 grows is shown as an example of development of the "town". As another example of development of the "town", predetermined building objects may be able to be arranged around the castle object 203 stepwise as the population of the resident characters increases. FIG. 17 shows an example of an image of the town area 201 in such case. In FIG. 17, a center area 251 in which the castle object 203 is displayed is present at a center portion of the town area 201. Twelve square areas (hereinafter, referred to as surrounding areas) 252 are shown by dotted lines so as to surround the center area 251. Regarding growth of the castle object 203, similarly to the above, the appearance of the castle object 203 automatically changes as the number of the resident characters increases. That is, the appearance of the castle object 203 becomes an appearance corresponding to the current castle rank data 324. In addition, for example, when the castle object 203 grows from the "rank 1" state to "rank 2", a predetermined building object may be able to be arranged in any one of the twelve surrounding areas 252 on the basis of an operation of the player (see FIG. 18). For example, by the player tapping any one of the twelve surrounding areas 252, a screen for selecting a building object to be arranged in the tapped area may be displayed. Also when the castle object 203 grows from the "rank 2" state to "rank 3", a predetermined building object may be able to be arranged further in another area (see FIG. 19). Alternatively, regardless of the rank of the castle object 203, when the number of the resident characters exceeds a predetermined number, a predetermined building object may be able to be arranged in any one of the twelve surrounding areas 252 on the basis of an operation of the player. For example, when the number of the resident characters reaches 50 or more, it is made possible to arrange a building object in any one area. Thereafter, when the number of the resident characters reaches 100 or more, it may be made possible to further arrange a building object in another area. That is, as the number of the resident characters increases, predetermined building objects may be able to be arranged one by one stepwise in the twelve surrounding areas 252 on the basis of an operation of the player. In other words, even when the number of the resident characters increases, a predetermined building object is not automatically arranged. That is, the castle object 203 automatically grows, but the player needs to manually install building objects in the surrounding areas 252. As described above, as the "town" which is a development target, two types of objects, that is, the castle object 203 and building objects that can be arranged in the surrounding areas 252 as described above, may be included. Because of this, both growth of the castle object 203 and arrangement of building objects are considered as part of development of the "town".

As the elements forming the "town" as described above, in addition to the building objects as described above, objects other than buildings, such as flowers, ponds, farms, statues, and playground equipment, may be able to be arranged. In addition, in the above example, the castle object 203 and the objects to be arranged in the surrounding areas 252 are arranged in different areas. However, the embodiment is not limited to the case where such two types of objects are arranged in different areas, and one of the two types of objects may be included in an area for the other of the two types of objects. For example, an area that is a "room" is prepared within the castle object 203, and another object (a furniture object, etc.) may be able to be arranged in the "room". Moreover, in this case, the number of "rooms" within the castle may be increased as the castle object 203 grows.

Figure 20:
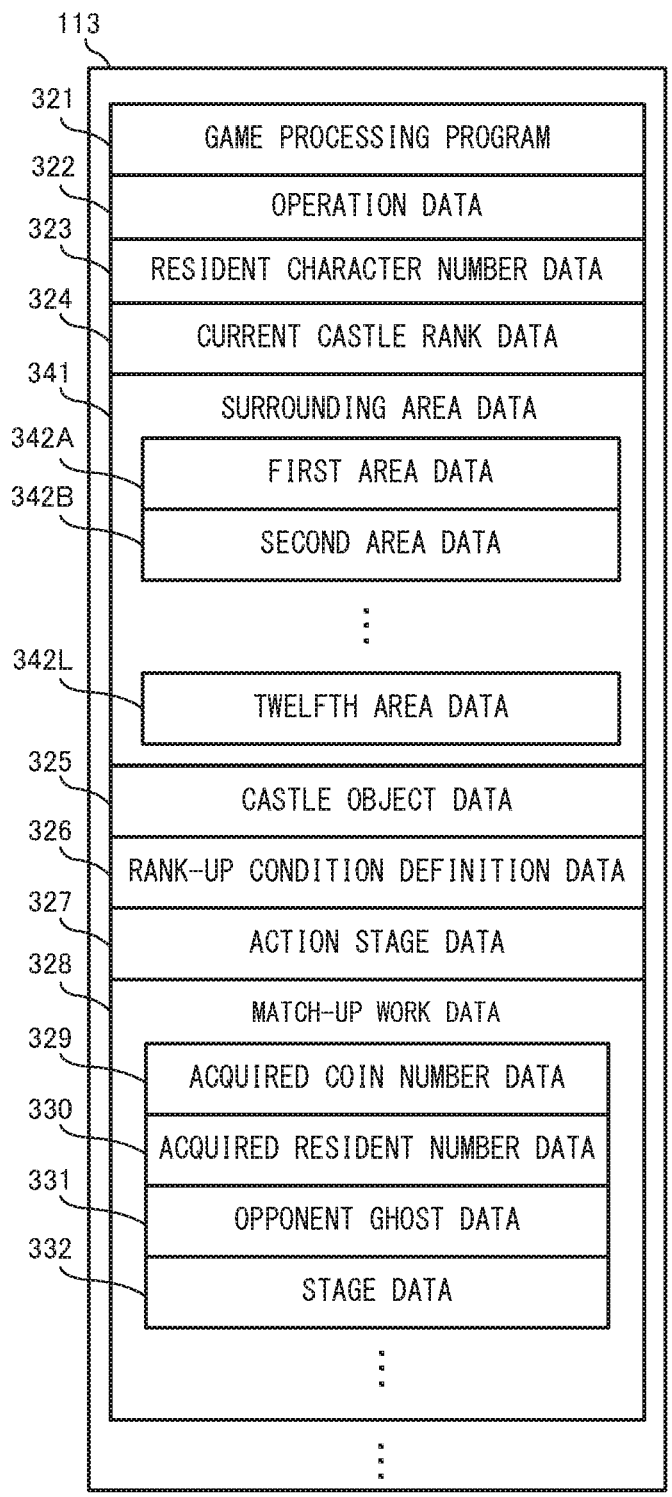
FIG. 20 is a diagram showing another non-limiting example of the programs and the information stored in the main memory 113 of the smart device 102.

In the case where the surrounding areas 252 are used as described above, in addition to the data shown in FIG. 12, for example, surrounding area data 341 may be further provided as shown in FIG. 20 as data related to the castle object 203. The surrounding area data 341 in FIG. 20 includes first area data 342A to twelfth area data 342L corresponding to the twelve surrounding areas 252, respectively. Each area data 342 includes information indicating whether a building object is arranged in the corresponding area, information indicating the arranged building object itself, etc. Each area data 342 may be initially set to a state where the area data 342 cannot be changed, and change of each area data 342 (based on an operation of the user) may be made possible one by one stepwise as the number of the resident characters increases. Then, on the basis of the contents of the area data 342, a building object different from the castle object 203 may be additionally displayed in the corresponding surrounding area 252. Accordingly, regarding development of the town, the entertaining features can be further enhanced.

The development target may be, for example, a tower type object, in addition to the castle object 203 as described above. In the case where the development target is a tower type object, for example, the height of the tower may be increased as the number of the resident characters increases. Moreover, in the above example, as the "town" which is the development target, the case of the single castle object 203 and the case where the objects to be arranged in the surrounding areas 252 are also included in addition to the castle object 203, have been described. In addition to these cases, the "town" which is the development target may be, for example, a town in which the castle object 203 as described above is not present and which includes building objects such as a plurality of house objects and shop objects, and various types of objects such as road objects and vehicle objects. In such a case, for example, only two or three building objects may be present in the town at start of the game, and the number of building objects may be automatically increased as the number of resident characters increases. Furthermore, the development target is not limited to the "town", and may be in any form as long as a plurality of objects are arranged in a predetermined area such as a city, a village, an island, or a room. Moreover, as another development target, an object representing a creature may be set. For example, a predetermined animal object or human object may be displayed as a development target.

In accordance with the contents of play in the action game, the course of growth may be changed. For example, as the resident characters, several types of resident characters are caused to appear. As an example, three types of resident characters, that is, "type A resident", "type B resident", and "type C resident", are assumed to be defined. The number of each type of the resident characters increases or decreases in accordance with a win/loss result of a match-up, similarly to the processing as described above. Then, the contents of growth of the castle object 203 may be made different in accordance with the proportion of each type of the resident characters acquired by the player in the action game. That is, even for the castle object 203 in the same "rank 2" state, the appearance of the castle object 203 may be made different depending on the proportion of each type of the resident characters. For example, it is assumed that 100 resident characters are present, and the appearance of the castle object 203 in the "rank 2" state may be made different between when 80 out of the 100 resident characters are "type A residents" and when 80 out of the 100 resident characters are "type B residents".

For example, a plurality of growth parameters may be previously set for the castle object 203, and degrees of influence to be provided to the growth parameters may be made different in accordance with the plurality of types of resident characters. For example, three parameters, that is, a parameter A that is a parameter regarding the color of the castle object, a parameter B that is a parameter regarding the shape of the castle object, and a parameter C that is a parameter regarding the size of the castle object, are previously set as parameters that influence the appearance of the castle object 203. At each end of the action game (in the result screen), the value of each parameter may be changed in accordance with the number of each type of resident characters acquired at this time. For example, the number of the type A residents is added to the parameter A, the number of the type B residents is added to the parameter B, and the number of the type C residents is added to the parameter C. Then, at the time of raising the rank of the castle object 203, the appearance of the castle object 203 after the raising of the rank may be changed on the basis of the three parameters. Accordingly, a more unique castle object 203 corresponding to the contents of play in the action game by the player can be presented, and it becomes possible to enhance the motivation of the player. In addition, in the case where the plurality of parameters as described above are used, at least part of the parameters may be changed on the basis of an element other than the above-described rate (the number of the resident characters). For example, the parameter may be changed on the basis of a time period for which the game is played, or a cumulative number of wins in the versus game. Furthermore, part of the parameters may be changed in a random manner. For example, the parameter C regarding the size of the castle object 203 may be changed on the basis of the number of the resident characters, but the parameters A and B regarding the color and the shape of the castle object 203 may be changed in a random manner.

In the case where the plurality of types of resident characters as described above are used, the total population of the plurality of types of resident characters may be used as the above-described rate, or the population of each type of resident characters may be used as the rate (in the latter case, a plurality of types of rates are used).

Regarding the win/loss determination for the action game, a win or a loss is determined on the basis of the number of the acquired coins in the above example. However, in another embodiment, a win or a loss may be determined on the basis of the number of the acquired resident characters, without using coins.

In the above example, the rate (the number of the resident characters), that is, the index indicating the skill of the player, is indicated by a value. However, the index may be indicated other than value, such as "A+", "A", "B+", and "B". In addition, in this case, "rise" or "increase" of the index means that the index changes to an index indicating a higher skill (e.g., the case where "B+" changes to "A"). Moreover, "fall" or "decrease" of the index means that the index changes to an index indicating a lower skill (e.g., the case where "B+" changes to "B"). Furthermore, for example, an index a higher value of which indicates a higher ability, such as dan, may be used. In this case, "rise" or "increase" of the index corresponds to the case where the index changes from a "third-degree dan" to a "second-degree dan". In addition, "fall" or "decrease" of the index corresponds to the case where the index changes from a "third-degree dan" to a "fourth-degree dan".

In another embodiment, a predetermined parameter associated with the player character 221 in the action game may be changed in accordance with the above-described rate (the number of the resident characters) increasing. For example, in accordance with the number of the resident characters increasing, the parameter of the player character 221 may be changed such that an advantageous effect for the player is achieved. For example, jumping power or a moving speed of the player character 221 may be increased. Alternatively, the power or the remaining character number of the player character 221 may be increased. Still alternatively, the time limit for game play may be extended from an initial time value. Still alternatively, the appearance of the player character 221 may be merely changed (in this case, an advantageous effect is not necessarily imparted but a change in appearance can be imparted). More specifically, the following control may be performed. First, the parameter as described above is prepared as data regarding the player character 221. Then, control may be performed in which the parameter of the player character 221 is directly changed in accordance with the rate (the number of the resident characters) increasing. In addition, as another control example, the parameter associated with the castle object 203 may be changed in accordance with the rate (the number of the resident characters) increasing, and the parameter of the player character 221 may be changed on the basis of the parameter. For example, control may be performed in which the jumping power of the player character 221 is increased when the "height" of the castle object 203 exceeds a predetermined value. By performing such control, an effect that is advantageous in the versus game is achieved, and thus the motivation of the player for the versus game can be enhanced. Furthermore, a motivation for the versus game and a motivation to cause the castle object 203 to grow are constructed as one cycle, and these two motivations can be synergistically enhanced, so that the entertaining features of the game can be further enhanced.

The game program, etc. according to the present embodiment can provide new game processing using an index that indicates the ability of a player at a game, and are useful for application to a portable smart device, various game apparatuses, etc.

What is claimed is:

1. A game system for performing game processing including a versus game in which a match-up of a player against an opponent is held, the game system comprising at least one processor configured to at least:
perform a versus game process against the opponent;
store rating data indicating skill of the player at the game relative to opponents;
determine a variation amount of the rating data for the player based on a score of the player and a score of the opponent in the versus game;
in response to a determination that the player has lost, decrease the rating data for the player by the variation amount without increasing the rating data for the opponent;
update the rating data based on a win/loss result of the player in the versus game;
determine whether the rating data satisfies a predetermined condition;
change a parameter associated with an object in the versus game in response to a determination that the predetermined condition has been satisfied; and
generate, for display to the player, an image of the object in which the changed parameter is reflected.

2. The game system according to claim 1, wherein:
the rating data is a value that increases or decreases based on the win/loss result of the player in the versus game, and
the value of the rating data increases when the player wins as a result of the versus game.

3. The game system according to claim 1, wherein the at least one processor is further configured to at least select another player having a value close to the rating data of the player, as the opponent in the versus game process.

4. The game system according to claim 3, wherein:
a plurality of opponents are deemed to be opponent candidates, and
wherein the at least one processor is further configured to at least:
display the plurality of opponent candidates such that any of the plurality of opponent candidates is selectable; and
select any of the plurality of opponent candidates based on an operation of the player.

5. The game system according to claim 1, wherein the win/loss result is determined by comparing scores of the player and the opponent in the versus game.

6. The game system according to claim 1, wherein:
the win/loss result is determined by comparing scores of the player and an opponent in the versus game, and
in response to a determination that the player has won, a variation amount of the rating data is determined such that the higher the score of the opponent, the larger the increase of the rating data.

7. The game system according to claim 1, wherein:
the win/loss result is determined by comparing scores of the player and an opponent in the versus game, and
in response to a determination that the player has lost, a variation amount of the rating data is determined such that the higher the score of the player, the larger the decrease of the rating data.

8. The game system according to claim 1, wherein the at least one processor is further configured to increase the rating data for the player by the variation amount without decreasing the rating data for the opponent in response to a determination that the player has won.

9. A game processing method for controlling a computer of a game system for performing game processing including a versus game in which a match-up of a player against an opponent is held, the game processing method comprising:
performing a versus game process against the opponent;
storing rating data indicating skill of the player at the game relative to opponents;
determining a variation amount of the rating data for the player based on a score of the player and a score of the opponent in the versus game;
in response to a determination that the player has lost, decreasing the rating data for the player by the variation amount without increasing the rating data for the opponent;
updating the rating data based on a win/loss result of the player in the versus game;
determining whether the rating data satisfies a predetermined condition;
changing a parameter associated with an object in the versus game in response to a determination that the predetermined condition has been satisfied; and
generating, for display to the player, an image of the object in which the changed parameter is reflected.

10. The method according to claim 9, wherein:
the rating data is a value that increases or decreases based on the win/loss result of the player in the versus game, and
the value of the rating data increases when the player wins as a result of the versus game.

11. The method according to claim 9, further comprising selecting another player having a value close to the rating data of the player, as the opponent in the versus game process.

12. The method according to claim 11, wherein a plurality of opponents are deemed to be opponent candidates, the method further comprising:
causing the plurality of opponent candidates to be displayed such that any of the plurality of opponent candidates is selectable; and
selecting any of the plurality of opponent candidates based on an operation of the player.

13. The method according to claim 9, wherein the win/loss result is determined by comparing scores of the player and the opponent in the versus game.

14. The method according to claim 9, wherein:
the win/loss result is determined by comparing scores of the player and an opponent in the versus game, and
in response to a determination that the player has won, a variation amount of the rating data is determined such that the higher the score of the opponent, the larger the increase of the rating data.

15. The method according to claim 9, wherein:
the win/loss result is determined by comparing scores of the player and an opponent in the versus game, and
in response to a determination that the player has lost, a variation amount of the rating data is determined such that the higher the score of the player, the larger the decrease of the rating data.

16. The method according to claim 9, further comprising in response to a determination that the player has won, increasing the rating data for the player by the variation amount without decreasing the rating data for the opponent.

17. A non-transitory computer-readable storage medium having stored therein a game program executed by a computer of a game system for performing game processing including a versus game in which a match-up of a player against an opponent is held, the game program causing the computer to at least execute:

performing a versus game process against the opponent;

storing rating data indicating skill of the player at the game relative to opponents;

determining a variation amount of the rating data for the player based on a score of the player and a score of the opponent in the versus game;

in response to a determination that the player has lost, decreasing the rating data for the player by the variation amount without increasing the rating data for the opponent;

updating the rating data based on a win/loss result of the player in the versus game;

determining whether the rating data satisfies a predetermined condition;

changing a parameter associated with an object in the versus game in response to a determination that the predetermined condition has been satisfied; and generating, for display to the player, an image of the object in which the changed parameter is reflected.

18. The non-transitory computer-readable storage medium according to claim 17, wherein:

the rating data is a value that increases or decreases based on the win/loss result of the player in the versus game, and the value of the rating data increases when the player wins as a result of the versus game.

19. The non-transitory computer-readable storage medium according to claim 17, wherein another player having a value close to the rating data of the player is selectable as the opponent in the versus game process.

20. The non-transitory computer-readable storage medium according to claim 19, wherein:

a plurality of opponents are deemed to be opponent candidates, and wherein the game program is further configured to cause the computer to at least execute:

causing the plurality of opponent candidates to be displayed such that any of the plurality of opponent candidates is selectable; and selecting any of the plurality of opponent candidates based on an operation of the player.

21. The non-transitory computer-readable storage medium according to claim 17, wherein the win/loss result is determined by comparing scores of the player and the opponent in the versus game.

22. The non-transitory computer-readable storage medium according to claim 17, wherein:

the win/loss result is determined by comparing scores of the player and an opponent in the versus game, and in response to a determination that the player has won, a variation amount of the rating data is determined such that the higher the score of the opponent, the larger the increase of the rating data.

23. The non-transitory computer-readable storage medium according to claim 17, wherein:

the win/loss result is determined by comparing scores of the player and an opponent in the versus game, and in response to a determination that the player has lost, a variation amount of the rating data is determined such that the higher the score of the player, the larger the decrease of the rating data.

24. The non-transitory computer-readable storage medium according to claim 17, wherein the rating data for the player is increased by the variation amount without decreasing the rating data for the opponent, in response to a determination that the player has won.

* * * * *